Feb. 15, 1966   C. G. BRAUN ETAL   3,234,851
WORK CHUCKING APPARATUS FOR TOOTH CUTTING MACHINE OR THE LIKE

Filed April 2, 1964                                                2 Sheets-Sheet 2

United States Patent Office 3,234,851
Patented Feb. 15, 1966

3,234,851
WORK CHUCKING APPARATUS FOR TOOTH
CUTTING MACHINE OR THE LIKE
Charles G. Braun and George H. Howing, Rochester,
N.Y., assignors to The Gleason Works, Rochester, N.Y.,
a corporation of New York
Filed Apr. 2, 1964, Ser. No. 356,819
10 Claims. (Cl. 90—1)

The present invention relates to work chucking apparatus for machine tools, especially apparatus for chucking steering gear sectors or like workpieces on tooth cutting machines of the general kind disclosed in co-pending application Serial No. 356,711, filed on even date herewith by William G. Buchanan and George H. Howing.

An object of the invention is apparatus of this kind adapted to secure workpieces rigidly to the work spindle of such a machine during a machining operation and also to accurately align the workpieces, angularly about the spindle axis, while they are being chucked.

Chucking apparatus according to one aspect of the invention comprises a chuck body having therein contractible means to receive and grip a cylindrical shank of a workpiece, a sleeve movable axially relative to the chuck body and supported against rotation relative thereto, said sleeve having a converging guide formation engageable with opposite sides of the body of the workpiece, resilient means for pressing said sleeve axially against the workpiece as it is moved axially into the chuck body, for thereby aligning the workpiece angularly with respect to said body, means for so moving the workpiece axially into the chuck, and means for subsequently operating said contractible means to grip the workpiece.

Chucking apparatus according to another aspect of the invention comprises a chuck body having therein a contractible collet adapted to receive a cylindrical shank of a workpiece, means axially movable in the body for effecting contraction of the collet to cause it to grip said shank, a sleeve movable axially on the body and keyed thereto against relative rotation, said sleeve having a converging guide formation engageable by opposite sides of the body of the workpiece when entering the collet, and resilient means for urging outward axial motion of the sleeve on the body to press said converging guide formation against the entering workpiece and thereby align the latter angularly with respect to the chuck body.

A preferred embodiment of the invention is shown in the accompanying drawings, wherein.

Figure 1:
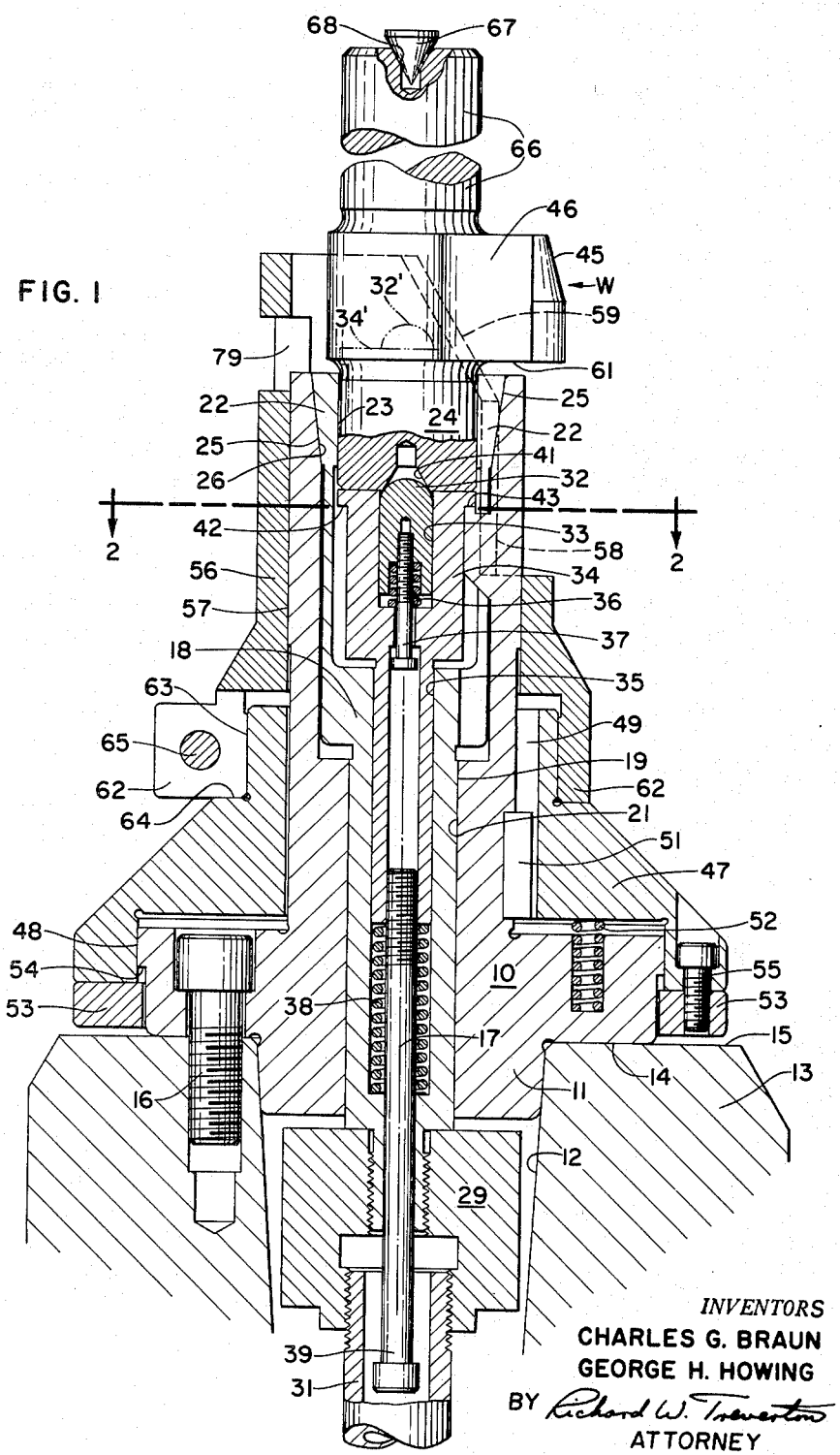
FIG. 1 is an axial sectional view through the chuck and related machine parts.

The body of the chuck, designated 10, is of tubular form and has a tapered hub 11 for seating in tapered bore 12 of spindle 13 of a tooth cutting machine, and a circular flange with plane face 14 for seating on the front face 15 of the spindle. Several screws 16 of which only one appears in FIG. 1, detachably secure the chuck to the spindle, for rotation as a unit therewith about spindle axis 17. A tubular collet 18 is slidable axially in the body 10, having a stem portion 19 guided in cylindrical bore 21 of the body, and having a workpiece engaging portion 22 slotted to provide three radially contractible jaws. The inner surface 23 of portion 22 is cylindrical, complementary to the cylindrical shank 24 of workpiece W. The outer surface 25 of collet portion 22 is conical, complementary to tapered conical bore 26 of the body 10, so that upon inward axial motion of the collet, downwardly in FIG. 1, the portion 22 is contracted radially to grip the workpiece.

Figure 4:
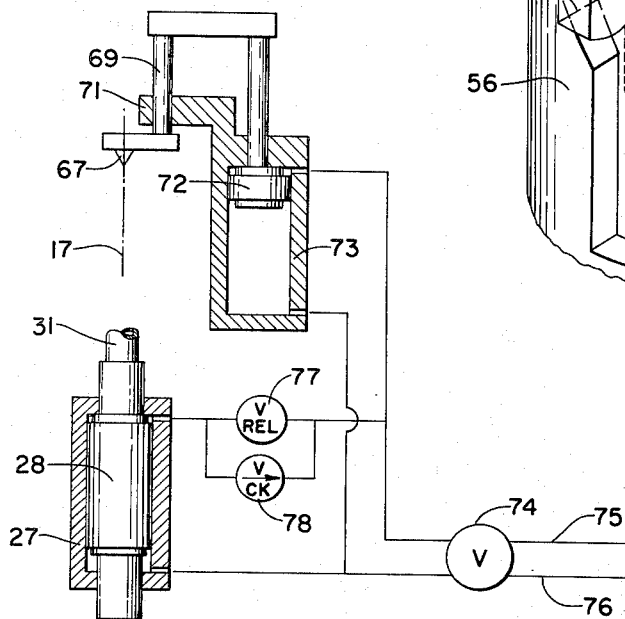
FIG. 4 is a diagrammatic view showing hydraulic pressure devices included in the apparatus.

For effecting such axial motion, an hydraulic chuck actuator 27, FIG. 4, is provided. The actuator has a piston 28 connected to stem 19 of the collet by a nut 29 screw-threaded thereto and a draw rod 31 screw-threaded to the nut and to the piston.

Figure 2:
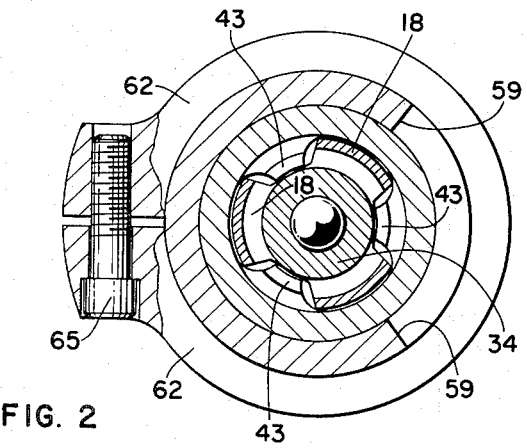
FIG. 2 is a cross-section in plane 2—2 of FIG. 1.

For guiding a workpiece into the chuck, a pilot pin 32 is slidably supported in an axial bore 33 in a tubular support 34 which itself is slidable in axial bore 35 in the stem 19 of the collet. The pin is urged axially outward in bore 33 by a spring 36, this motion being limited by abutment of the head of a screw 37 with a shoulder in the bore of the support 34, the screw being threaded to the pin. The support 34 is also urged outwardly in bore 35, by a spring 38. Threaded into support 34 there is a screw 39 whose head abuts the inner end of stem 19 of the collet to limit outward motion of the support. Accordingly, when there is no workpiece in the chuck, the pilot pin and its support project to the position relative to the collet that is shown by broken lines 32' and 34', respectively. In this position the pilot pin and the adjacent end surface of the support may be engaged respectively by the center recess 41 and end face of shank 24 of a workpiece being inserted. The spring 36 yields to accommodate slight variations in the depths of the center recesses 41 of workpieces, and the spring 38 yields as the workpieces enter the collect. The depth of workpiece insertion is limited by the abutment of annular shoulder 42 of pilot support 34 with internal projections 43 on the body 10. As shown in FIG. 2, the projections extend into the slots in the collet adjacent the work-engaging portion 22 of the latter.

In order to cut teeth 45 in the workpiece W which will be accurately centered in the sector-shaped body 46 of the latter, angular positioning means are needed, especially in cases where the teeth have been rough cut close to finished size in a preceding rough cutting operation. The positioning means provided by the present invention comprise a two-part sleeve slidable axially on the body 10. The inner part of the sleeve, designated 47, has a sliding fit with outer cylindrical surface 48 of the flange on body 10 and a keyway 49 which slidably receives a key 51 on the body to prevent relative rotation. A plurality of springs 52, arranged in a circle about axis 10 and only one of which appears in the drawings, act between the chuck body and sleeve part 47 to urge the sleeve axially outward (upward in FIG. 1). Such motion is limited by a retainer ring 53 abutting a shoulder 54 on the body flange, the ring being secured to the part 47 by screws 55. The outer part of the sleeve, designated 56, is slidable on cylindrical surface 57 of body 10, and has a converging guide formation, comprising a slot 58 with converging sides 59, for engagement with the substantially radial edges 61 at the lower end of the sector-shaped workpiece body 46. The slot 58 is so proportioned that as the workpiece is inserted in the chuck the edges 61 contact both slot sides 59 prior to the abutment of surfaces 42, 43, so that the workpiece will move the sleeve 47, 56, axially inward against the resistance of springs 52. Should the workpiece not be accurately aligned with the chuck, angularly about axis 17, one or the other of edges 61 will contact a slot side 59 before the other edge 61 and, due to the resistance of springs 52, will cam the workpiece angularly to cause both edges 61 to contact the slot sides before the inward motion of the sleeve is completed, thereby perfecting the alignment.

The outer sleeve section 56 is detachably connected to the inner section 47, and for this purpose has a split inner rim 62 which encircles outer cylindrical surface 63 of section 47 and seats, axially, against shoulder 64 of the latter.

The portions of the rim on opposite sides of the split are connected by screw 65 which may be loosened to enable removal of the outer sleeve section for replacement or for repair of surfaces 59 which may become worn by prolonged usage. Also, by loosening of the screw the sleeve section 56 may be adjusted angularly, about axis 17, to provide the exact angular positioning of the workpiece in the chuck that is desired. This latter adjustment is of particular value where the teeth are to be rough cut and finish cut on two different machine spindles, since it enables the sleeves 47, 56 on these spindles to both be adjusted to bring the workpieces into exactly the same angular relation to both spindles. It will be understood of course that for this purpose the sleeves of the chucks on both spindles should be exactly alike. The entire sleeve 47, 56 may be taken off, by removing screws 55, to provide access to chuck holding screws 16.

A typical workpiece has a relatively long upper shank 66, and preferably a center 67 is provided on the cutting machine for assisting in support of the workpiece during the chucking and cutting operations. As illustrated in FIGS. 1 and 4, the center engages in a center recess 68 in shank 66 and is carried by a guide rod 69 that is slidable in a bracket 71 of the machine. The guide rod is connected to an hydraulic piston 72 that is reciprocable in a cylinder 73 on the bracket. Pressure is applied to one face or the other of piston 72 by a reversing valve 74 which is connected to hydraulic pressure and exhaust lines 75 and 76. This valve also controls the application of pressure to chuck actuating piston 28. A relief valve 77 and check valve 78 are so arranged that piston 72 will advance center 67 against the resistance of springs 52 to press the workpiece into the chuck before the piston 28 acts to close the chuck; and that the chuck will be opened by piston 28 simultaneously with action of piston 72 to lift the center clear of the workpiece, to enable removal of the latter from the chuck.

Figure 3:
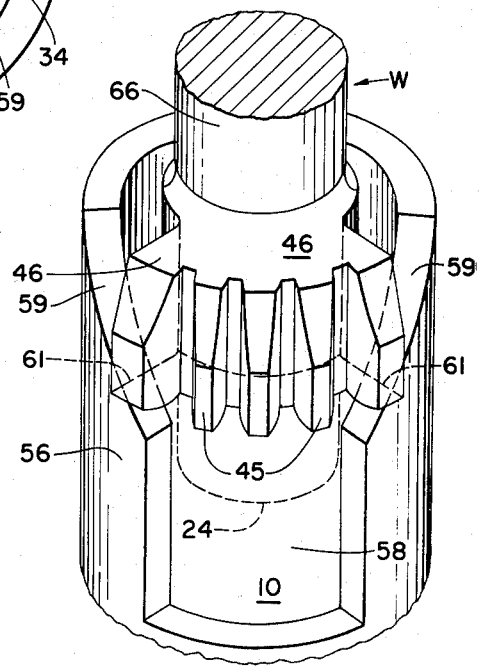
FIG. 3 is a fragmentary isometric view of the work-aligning part of the apparatus, with a workpiece therein.

Especially in machines having automatic work handling mechanism, such as disclosed in the aforementioned co-pending application, it is preferred that the slot 58 extend considerably below the converging slot walls 59, as best shown in FIG. 3, and to provide on the opposite side of sleeve part 56 an opening 79 which extends below the upper end faces of body 10 and collet 18. The slot 58 and this opening 79 constitute ready escape passages for cutting chips being washed away by a stream of liquid coolant directed against the workpiece during the cutting operation.

Having now described the preferred embodiment of our invention, what we claim is:

1. Work chucking apparatus comprising a chuck body having therein contractible means to receive and grip a cylindrical shank of a workpiece, a sleeve movable axially relative to the chuck body and supported against rotation relative thereto, said sleeve having a converging guide formation engageable with opposite sides of the body of the workpiece, resilient means for pressing said sleeve axially against the workpiece as it is moved axially into the chuck body, for thereby aligning the workpiece angularly with respect to said body, means for so moving the workpiece axially into the chuck, and means for subsequently operating said contractible means to grip the workpiece.

2. Apparatus according to claim 1 having a member adapted to engage the workpiece shank prior to reception of said shank by said contractible means, said member being slidable axially in said body, and resilient means for urging outward axial motion of said member relative to the chuck body.

3. Apparatus according to claim 2 in which said member comprises a pilot pin adapted to engage a center recess in the workpiece shank.

4. Apparatus according to claim 3 in which there is a support for said pin and said resilient means for urging outward axial motion thereof, said support being engageable with an end face of the workpiece shank adjacent said center recess and being slidable axially in the chuck body, and resilient means for urging outward axial motion of said support relative to the chuck body.

5. Apparatus according to claim 1 in which said contractible means comprises a radially contractible collet movable axially in the body, and means for effecting contraction of said collet, to grip said shank, upon axial motion of the collet inwardly of the chuck body.

6. Apparatus according to claim 1 in which said sleeve is movable axially on the chuck body and is keyed thereto against relative rotation, and the resilient means for pressing the sleeve axially against the workpiece is arranged to act between the sleeve and the chuck body.

7. Work chucking apparatus comprising a chuck body having a contractible collet that is adapted to receive a cylindrical shank of a workpiece and is axially movable in the body, means for effecting contracting of the collet, to grip said shank, upon axial motion of the collet inwardly of the body, a pilot pin adapted to engage a center recess in the workpiece shank prior to entry thereof into the collet, a pin support in which the pilot pin is slidable axially and which itself is engageable with the adjacent end face of the workpiece shank and is slidable axially in the chuck body, resilient means for urging outward axial motion of the pilot pin relative to said support and of the latter relative to the body, abutment means to stop inward axial motion of the said support relative to the body, a sleeve movable axially on the body and keyed thereto against relative rotation, and resilient means for urging outward axial motion of the sleeve on the chuck body, said sleeve having a converging guide formation engageable by opposite sides of the body of the workpiece when entering the collet, for aligning the workpiece angularly with respect to the chuck body before said support is stopped by said abutment means.

8. Apparatus according to claim 7 in which said sleeve comprises a section containing said guide formation and another section that is keyed to the chuck body against relative rotation, and means, connecting said sections, which enable relative angular adjustment of them about the chuck axis.

9. Work chucking apparatus comprising a chuck body having a contractible collet that is adapted to receive a cylindrical shank of a workpiece and is axially movable in the body, means for effecting contraction of the collet, to grip said shank, upon axial motion of the collet inwardly of the body, a pilot pin adapted to engage a center recess in the workpiece shank prior to entry of the shank into the collet, a pin support in which the pilot pin is slidable axially and which itself is engageable with the adjacent end face of the workpiece shank and is slidable axially in the chuck body, resilient means for urging outward axial motion of the pilot pin relative to said support and of the latter relative to the body, abutment means to stop inward axial motion of the said support relative to the body, a sleeve movable axially on the body and keyed thereto against relative rotation, resilient means for urging outward axial motion of the sleeve on the chuck body, said sleeve having a converging guide formation engageable by opposite sides of the body of the workpiece when entering the collet, for aligning the workpiece angularly with respect to the chuck body, before said support is stopped by said abutment means, fluid pressure actuated means for moving the workpiece axially into the chuck to effect such alignment, and fluid pressure actuated means for subsequently moving the collet axially to grip the workpiece.

10. Work chucking apparatus comprising a chuck body having therein a contractible collet adapted to receive a cylindrical shank of a workpiece, means axially movable in the body for effecting contraction of the collet to cause it to grip said shank, a sleeve movable axially on the body and keyed thereto against relative rotation, said sleeve having a converging guide formation engageable by opposite sides of the body of the workpiece when entering the collet, and resilient means for urging outward axial motion of the sleeve on the body to press said converging guide formation against the entering workpiece and thereby align the latter angularly with respect to the chuck body.

References Cited by the Applicant

UNITED STATES PATENTS 2,820,641  1/1958  Garrison et al. _ _ _ _ _ _  279—106

FOREIGN PATENTS 1,029,700  10/1958  Germany.

WILLIAM W. DYER, JR., *Primary Examiner.*